(12) United States Patent  (10) Patent No.: US 8,651,584 B2
Hino  (45) Date of Patent: Feb. 18, 2014

(54) WHEEL RIM FOR TIRE

(75) Inventor: Hidehiko Hino, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 362 days.

(21) Appl. No.: 13/131,720

(22) PCT Filed: Nov. 25, 2009

(86) PCT No.: PCT/JP2009/069824
§ 371 (c)(1),
(2), (4) Date: May 27, 2011

(87) PCT Pub. No.: WO2010/061831
PCT Pub. Date: Jun. 3, 2010

(65) Prior Publication Data
US 2011/0233992 A1  Sep. 29, 2011

(30) Foreign Application Priority Data
Nov. 28, 2008  (JP) .................................. 2008-304789

(51) Int. Cl.
*B60B 21/00* (2006.01)
(52) U.S. Cl.
USPC ..................................................... 301/95.101
(58) Field of Classification Search
USPC .................................................... 301/95.101
See application file for complete search history.

(56) References Cited

U.S. PATENT DOCUMENTS

2003/0201045 A1  10/2003  Adams

FOREIGN PATENT DOCUMENTS

| JP | 56-97103 U | 8/1981 |
| JP | 59-6000 U | 4/1984 |
| JP | 60-25802 A | 2/1985 |
| JP | 3-121102 U | 12/1991 |
| JP | 5-338402 A | 12/1993 |
| JP | 6-135202 A | 5/1994 |
| JP | 8-216604 A | 8/1996 |
| JP | 11-192804 A | 7/1999 |
| JP | 11-208205 A | 8/1999 |
| JP | 2003-320822 A | 11/2003 |
| JP | 2004-196005 A | 7/2004 |
| JP | 2008-132949 A | 6/2008 |
| JP | 2010-6135 A | 1/2010 |

*Primary Examiner* — H Gutman
(74) *Attorney, Agent, or Firm* — Birch, Stewart, Kolasch & Birch, LLP

(57) ABSTRACT

A wheel rim 1 for a tire 2 including a rim portion 1A having a rim body 5 and a pair of flanges 6, the rim body 5 having seat portions 5a for seating bead portions 2c of the tire 2 at both ends of the rim body 5 in a rotation axis direction thereof, and the pair of flanges 6 being continuously provided on both sides of the rim body 5 and extending radially outward, wherein convex portions 9 which extend in a direction intersecting with a tire circumferential direction are provided at distances from one another in the circumferential direction on an outer surface 6o, which does not come into contact with the tire 2, of the flanges 6 in the rotation axis direction and/or on an inner surface of the rim body 5 in a radial direction.

18 Claims, 12 Drawing Sheets

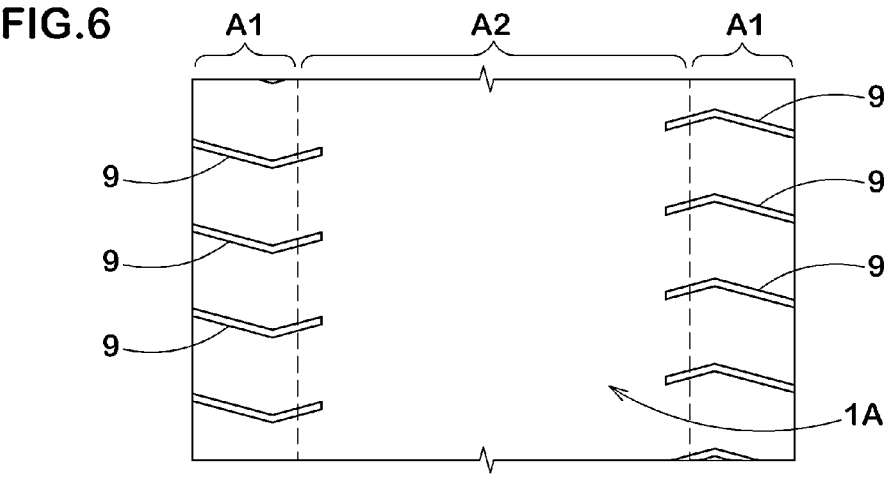
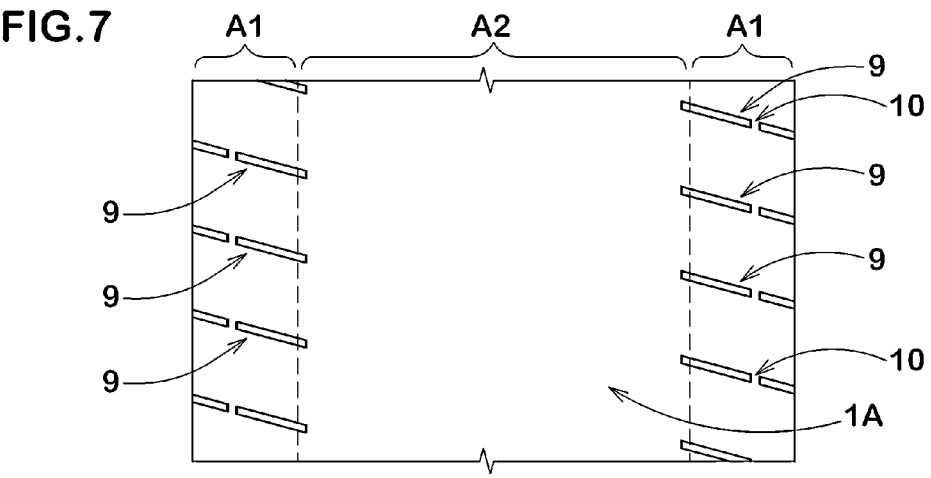
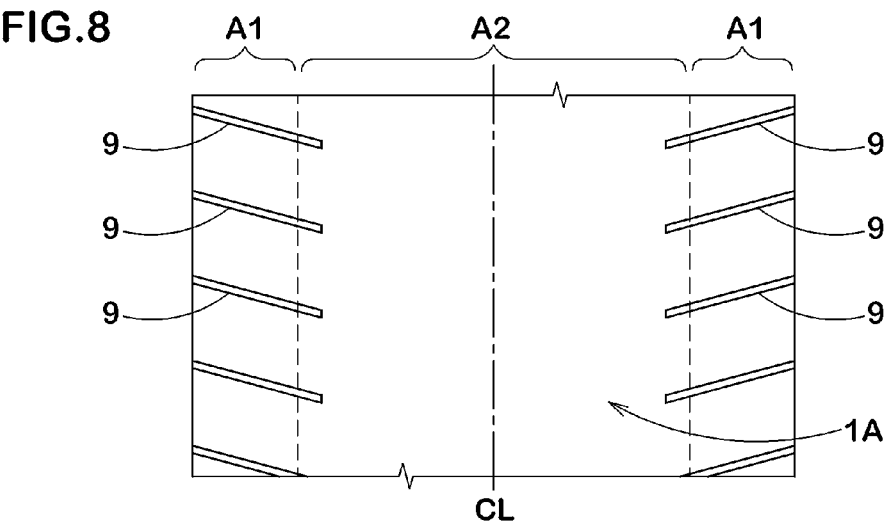

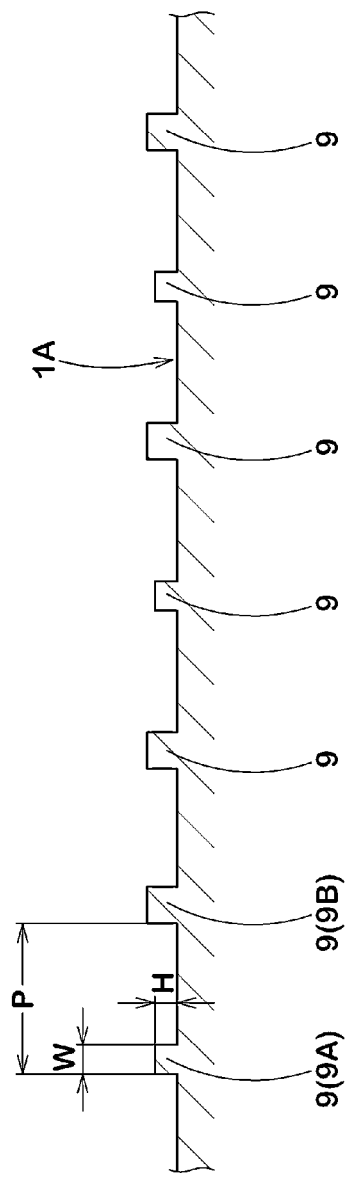
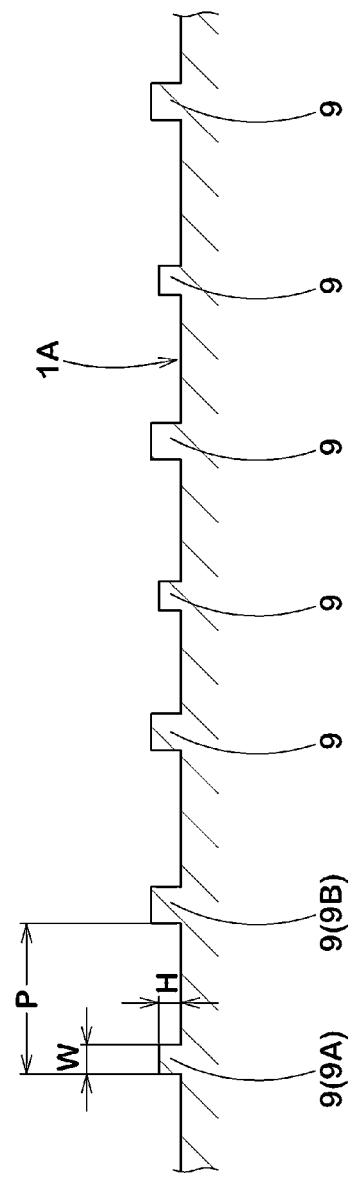
FIG.19(a)
FIG.19(b)

WHEEL RIM FOR TIRE

TECHNICAL FIELD

The present invention relates to a wheel rim for a tire which is of help to lower the temperature of a mounted tire and to enhance the durability of the tire or a wheel itself.

BACKGROUND ART

A bead portion of a tire is repeatedly deformed largely during running. Therefore, temperature of the bead portion during running is raised. Such temperature rise deteriorates rubber of the bead portion and the rubber is destroyed in some cases. Therefore, to enhance the durability of the tire, it is necessary to prevent the temperature rise of the bead portion.

To suppress the temperature rise of the bead portion, attempts have been made to enhance the rigidity of the bead portion and to reduce the deformation itself during running. However, this method has problems that a tire mass is increased, a kinematic performance is lowered, and fuel economy is deteriorated.

The present inventors have earnestly repeated researches and as a result, they have found that if convex portions extending in a direction intersecting with a circumferential direction are provided at intervals in the circumferential direction on an outer surface in the rotation axis direction which does not come into contact with the tire, of a flange of the wheel rim and/or on a radially inner surface of a rim body, the heat-dissipating performance of the rim body is markedly enhanced and, as a result, it is possible to suppress temperature rise of the bead portion of the tire which comes into contact with the rim body or of air in a tire cavity, and to enhance the durability of the tire. Thus, the inventors have accomplished the present invention. Examples of prior arts concerning the wheel rim are as follows:
Patent Literature 1: JP-A-6-135202
Patent Literature 1: JP-A-8-216604
Patent Literature 1: JP-A-5-338402

DISCLOSURE OF THE INVENTION

Problem to be Solved by the Invention

The present invention has been accomplished in view of the above circumstances. It is a main object of the invention to provide a wheel rim for a tire which is of help to suppress a temperature rise of a mounted tire or a wheel itself to thereby enhance the durability of the tire or the wheel.

Means to Solve the Problem

The present invention provides a wheel rim for a tire including a rim portion having a rim body and a pair of flanges, the rim body having seat portions for seating bead portions of the tire at both ends of the rim body in a rotation axis direction thereof, the pair of flanges being continuously provided on both sides of the rim body and extending radially outward, wherein convex portions which extend in a direction intersecting with a circumferential direction of the tire are provided at distances from one another in the circumferential direction, on an outer surface of the flanges in the rotation axis direction which does not come into contact with the tire, and/or on an inner surface of the rim body in a radial direction.

According to the wheel rim for a tire of the present invention, the convex portions extending in the direction intersecting with the circumferential direction are provided at intervals in the circumferential direction on the outer surface of the flanges which does not come into contact with the tire and/or on the inner surface of the rim body. Such convex portions increase the surface area of the rim portion and enhance the heat-dissipating performance. The convex portions stir the air flowing along the surface of the rim portion by rotation of the wheel rim to produce a turbulent flow, thereby further enhancing the heat-dissipating performance. By the synergism, the heat-dissipating performance of the rim portion is largely enhanced, and heat of not only the rim but also the tire cavity and the bead portion of the tire which comes into contact with the rim body, is efficiently discharged outside, and the temperature rise is suppressed. With this, the durability of the tire and the wheel rim is enhanced.

BRIEF DESCRIPTION OF THE DRAWINGS

FIG. 6 is a development view of an inner surface of a rim portion showing another embodiment of convex portions;
FIG. 7 is a development view of an inner surface of a rim portion showing another embodiment of the convex portions;
FIG. 8 is a development view of an inner surface of a rim portion showing another embodiment of the convex portions;
FIG. 19 are cross sectional views showing another embodiment of the convex portions taken along a circumferential direction of an inner surface of a rim portion.

| Explanation of Symbols | |
|---|---|
| 1 | Wheel rim for tire |
| 1A | Rim portion |
| 1B | Disk portion |
| 2 | Pneumatic tire |
| 3 | Tire/rim assembly |
| 5 | Rim body |
| 5a | Seat portion |

-continued

Explanation of Symbols

| | |
|---|---|
| 5ai | Inner surface of seat portion |
| 5b | Well portion |
| 6 | Flange |
| 6o | Outer surface of flange |
| 9 | Convex portion |
| 10 | Disconnection of convex portion |
| A1 | Outer region of rim portion |
| A2 | Central region of rim portion |

BEST MODE FOR CARRYING OUT THE INVENTION

Hereinafter, embodiments of the present invention will be described with reference to the drawings.

[First Embodiment]

Figure 1:
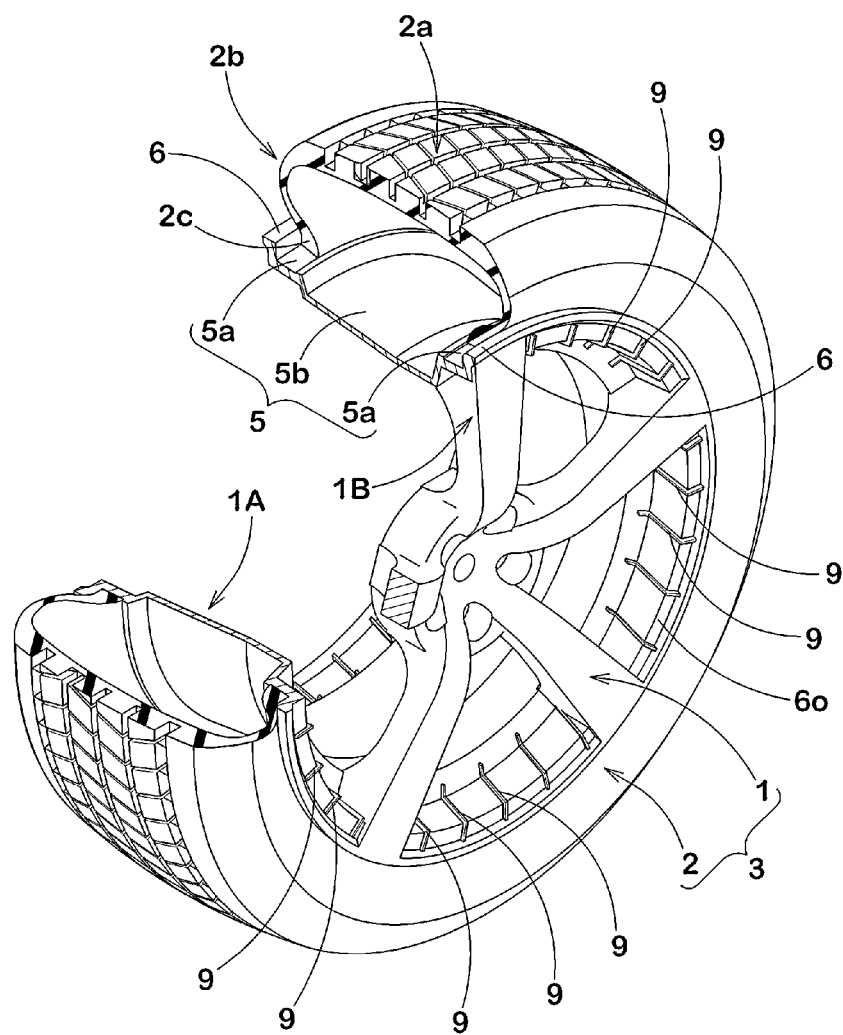
FIG. 1 is a perspective view of an entire tire/rim assembly showing an embodiment of the present invention.
Figure 2:
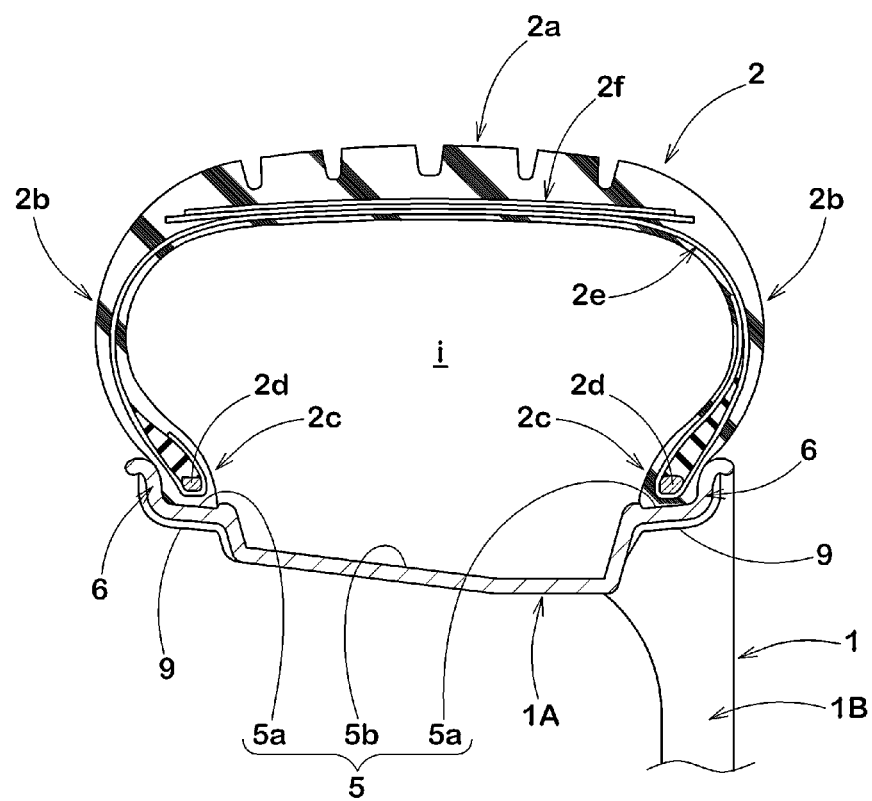
FIG. 2 is a partial cross sectional view thereof.

FIG. 1 is a perspective view of an entire tire/rim assembly 3 in which a pneumatic tire 2 is mounted around a wheel rim 1 for a tire (hereinafter, also referred to simply as "wheel rim") according to a first embodiment. FIG. 2 is a partial cross sectional view thereof.

The pneumatic tire 2 is a tubeless radial tire for a passenger vehicle. The pneumatic tire 2 includes a tread portion 2a, a pair of side wall portions 2b and 2b extending radially inward of the tire from both ends of the tread portion 2a, and a pair of bead portions 2c, 2c provided on inner ends of the side wall portions. The pneumatic tire 2 includes a carcass 2e of a radial structure which extends in a toroidal shape between bead cores 2d, 2d embedded in the bead portions 2c, 2c, and a belt layer 2f disposed radially outward of the carcass 2e and in the tread portion 2a.

The wheel rim 1 integrally includes a rim portion 1A and a disk portion 1B, and is made of a metal material such as steel, magnesium alloy, or aluminum alloy.

The rim portion 1A includes a rim body 5 and flanges 6 continuously provided on both sides of the rim body 5.

The rim body 5 includes a pair of seat portions 5a for seating the bead portions 2c, 2c of the pneumatic tire 2, and a well portion 5b having a groove shape and extending in the circumferential direction. The pair of seat portions 5a are provided on both ends of the rim body 5 in the rotation axis direction. The well portion 5b is formed between the seat portions 5a, 5a and has such depth and width that the bead portions 2c and 2c fall into the well portion 5b when the pneumatic tire 2 is attached and detached.

The flanges 6 extend outward in a width direction of the tire along an axially outer surface of the bead portions 2c, 2c of the pneumatic tire 2 mounted on the seat portions 5a.

The rim portion 1A has a cylindrical shape which is continuous in the circumferential direction with keeping substantially the same cross sectional shape.

The disk portion 1B includes a plurality of (five in this embodiment) spokes extending inward in the radial direction of the tire from an inner circumferential surface of the rim portion 1A. The disk portion 1B may be formed into a disk shape in the literature.

Figure 3:
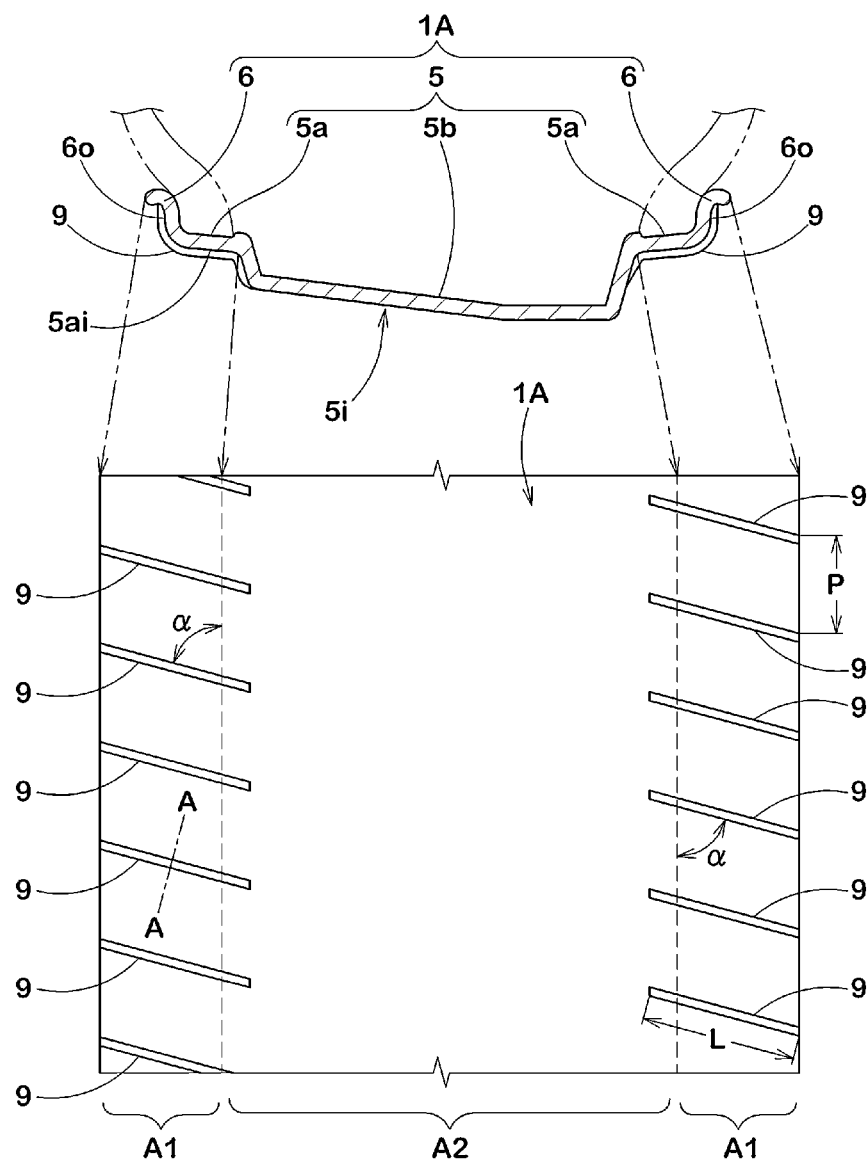
FIG. 3 is a development view of an inner surface of a rim portion of a wheel rim.
Figure 4:
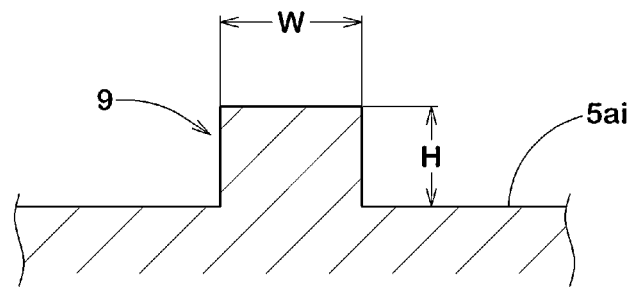
FIG. 4 is a cross sectional view thereof taken along the line A-A in FIG. 3.

FIG. 3 is a development view of the inner surface of the rim portion 1A. FIG. 4 is a cross sectional view thereof taken along the line A-A.

As clearly shown in FIG. 3, the wheel rim 1 is provided with a plurality of convex portions 9 extending in a direction intersecting with the circumferential direction, at distances from one another in the circumferential direction, on an outer surface 6o of the flange 6 in the rotation axis direction which does not come into contact with the pneumatic tire 2, and/or on an inner surface 5i of the rim body 5 in the radial direction.

Figure 5:
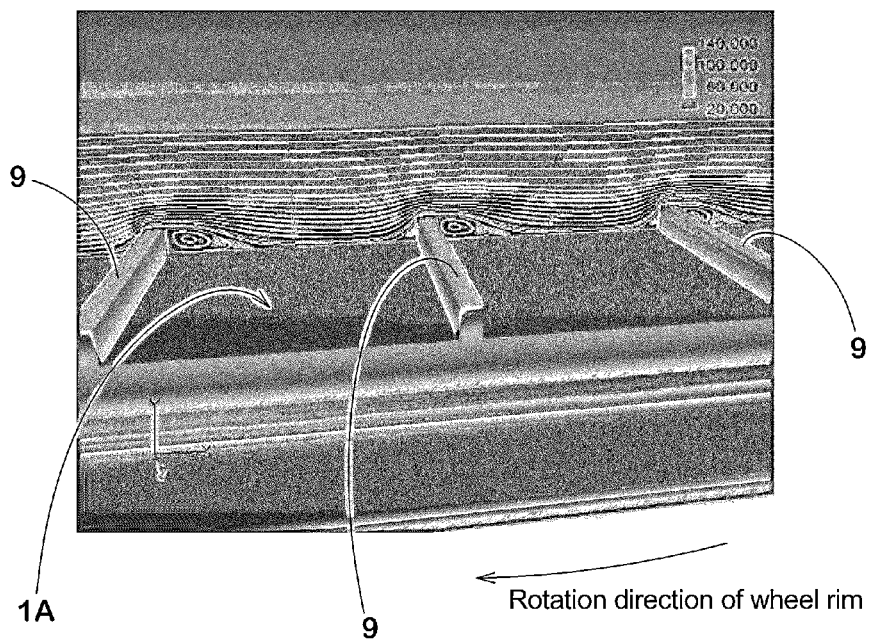
FIG. 5 is a diagram showing air flow obtained by fluid analysis.

The convex portions 9 increase the surface area of the rim portion 1A, thereby enhancing the heat-dissipating performance of the rim portion 1A. As a result of various experiments performed by the present inventors, as shown in FIG. 5, the inventors have found that the convex portions 9 stir air flowing along a surface of the rim portion 1A generated by rotation of the tire/rim assembly 3 to produce a turbulent flow, and this turbulent flow effectively draws heat from the rim portion 1A. That is, air which comes into contact with a surface of the rim has the highest temperature, and the temperature of air becomes lower with increasing distance from the rim surface, but since the turbulent flow guides, to the rim surface, low temperature air at a position away from the rim surface and accelerates heat exchange with a high temperature layer, it is possible to efficiently lower the surface temperature of the rim.

Therefore, the wheel rim 1 of this embodiment is efficiently cooled with the convex portions 9 by running. Heat of the bead portion 2c of the tire 2 which is in contact with the wheel rim 1 and heat of air charged in a tire cavity "i" are efficiently discharged outside through the rim portion 1A having an excellent heat-dissipating performance. According to this configuration, the temperature rise of the bead portion 2c is suppressed, and the durability of the tire 2 is enhanced. Especially, if a run-flat tire which can continuously run even when the tire blows is mounted around the wheel rim of this embodiment, it is possible to suppress heating of the bead portion, and to increase a mileage of the run-flat.

Each of the convex portions 9 of the embodiment extends to cross outside regions A1, A1 of the rim portion 1A including the outer surface 6o of the flange 6 in the rotation axis direction and the inner surface 5ai of the seat portion 5a. The convex portions 9 are provided on both left and right sides of the rim portion 1A.

As shown in FIG. 4, a cross sectional shape of the convex portion 9 which is perpendicular to a longitudinal direction thereof is not especially limited, and it is possible to employ various shapes such as a rectangular shape, a semicircular shape, a triangular shape, and a trapezoidal shape. Among them, the rectangular shape as in the embodiment is preferable. Such a convex portion 9 having the rectangular cross section is of help to more effectively stir air passing in the vicinity of the inner surface of the rim portion 1A and to enhance the heat-dissipating performance.

The cross sectional area of the convex portion 9 which is perpendicular to the longitudinal direction thereof is not especially limited. However, if the cross sectional area is too small, increase of the surface area of the wheel rim 1 is small, so there is a possibility that a cooling effect cannot sufficiently be obtained, and if the cross sectional area is too large on the contrary, this is not preferable because the rim mass is excessively increased. On the basis of such viewpoints, the cross sectional area of one convex portion 9 is preferably 1 mm$^2$ or more, more preferably 4 mm$^2$ or more, still more preferably 6 mm$^2$ or more, and it is also preferably 250 mm$^2$ or less, more preferably 100 mm$^2$ or less, still more preferably 50 mm$^2$ or less, especially preferably 25 mm$^2$ or less, most preferably 9 mm$^2$ or less.

If a projecting height H of the convex portion 9 is too small, there is a possibility that an effect of stirring air cannot sufficiently be obtained. If the projecting height is too large on the contrary, air does not sufficiently enter a squinch in a rear portion of the convex portion 9, and there is a possibility that the heat-dissipating performance cannot sufficiently be obtained and the convex portion 9 interferes with a brake device (not shown). On the basis of such viewpoints, the height of the convex portion 9 is preferably 0.5 mm or more, more preferably 1 mm or more, still more preferably 2 mm or more, and it is also preferably 5 mm or less. In a similar manner, the maximum width W of the convex portion 9 in a direction perpendicular to the longitudinal direction thereof is preferably 1 mm or more, more preferably 3 mm or more, and it is also preferably 20 mm or less, more preferably 10 mm or less.

A placement pitch P of the convex portions 9 in the circumferential direction is not especially limited. However, if it is too large, the number of the convex portions 9 which can be disposed becomes small, the effect of stirring air cannot sufficiently be obtained, and there is a possibility that the heat-dissipating performance of the wheel rim 1 cannot sufficiently be enhanced. If the pitch P is excessively small, air does not sufficiently hit the surface of the rim portion between the convex portions 9, 9 and there is a possibility that the heat-dissipating performance is deteriorated. On the basis of such viewpoints, if the placement pitch P of the convex portions 9 is expressed in a center angle (center angle around a rotation center of the wheel rim), the pitch is preferably 60° or less, more preferably 12° or less, and still more preferably 6° or less, and it is also preferably 1° or more, more preferably 2° or more. In the case that a disk portion or a spoke hinders the formation of the convex portions, that portion is not taken into consideration as a value of the placement pitch.

To stir air flowing along the surface of the rim portion 1A when the tire/rim assembly 3 runs, it is necessary that the convex portion 9 extends in the direction intersecting with the circumferential direction. Therefore, the convex portion 9 should extend at an angle α which is greater than 0° with respect to the circumferential direction.

As a result of conducting fluid analysis in detail, the present inventors have found that as shown in FIG. 5, spiral stagnation of air is generated behind the convex portion 9 by the rotation of the wheel rim 1, but when the angle α of the convex portion 9 is 90°, the stagnation is continuously generated at the same position for a long time during running. This stagnation is not preferable because this deteriorates the heat-dissipating performance of the rim portion 1A.

To prevent the stagnation from staying, it is preferable to incline the convex portion 9 at the angle α which is smaller than 90° with respect to the circumferential direction. With this configuration, the stagnation of air is moved rearward along the inclination of the convex portion 9, and it is possible to prevent the stagnation from staying at the same position. On the basis of such a viewpoint, the angle α of the convex portion 9 with respect to the circumferential direction thereof is preferably 5° or more, more preferably 10° or more, and it is also preferably 75° or less, more preferably 60° or less.

A continuous length L of the convex portion 9 is preferably at least 3 mm, more preferably 5 mm or more, still more preferably 10 mm or more. If the length L of the convex portion is less than 3 mm, there is a possibility that the effect of stirring air cannot sufficiently be obtained. A preferable upper limit value of the length L of the convex portion 9 may appropriately be set in accordance with a rim size.

When the convex portions 9 are provided on the outer surface 6o of the flange 6 and the inner surface 5ai of the seat portion 5a as in this embodiment, it is possible to more effectively cool these portions. Therefore, it is possible to more directly suppress the temperature rise of the bead portion 2c which comes into contact with the flange 6 and the seat portion 5a.

Although the convex portions 9 shown in FIG. 3 extend straightly, the convex portions 9 are not limited to such an embodiment. For example, angles of the convex portions 9 with respect to the circumferential direction may be changed halfway as shown in FIG. 6. Each of the convex portions 9 in this embodiment has one bent portion and extends substantially in an L-shape or the like.

As shown in FIG. 7, the convex portion 9 may have a short disconnection 10. In this embodiment, this disconnection 10 is provided at a connection between the outer surface 6o of the flange 6 and the inner surface 5ai of the seat portion 5a. This disconnection 10 is effective for stirring air flow in more complicated way.

As shown in FIG. 8, the convex portions 9 may be inclined symmetrically with respect to a center line CL of the rim, that is, may have a so-called rotation directional property.

The convex portions 9 can be easily formed by casting, cutting, or forging at the same time when the wheel rim 1 is formed.

[Second Embodiment]

Figure 9:
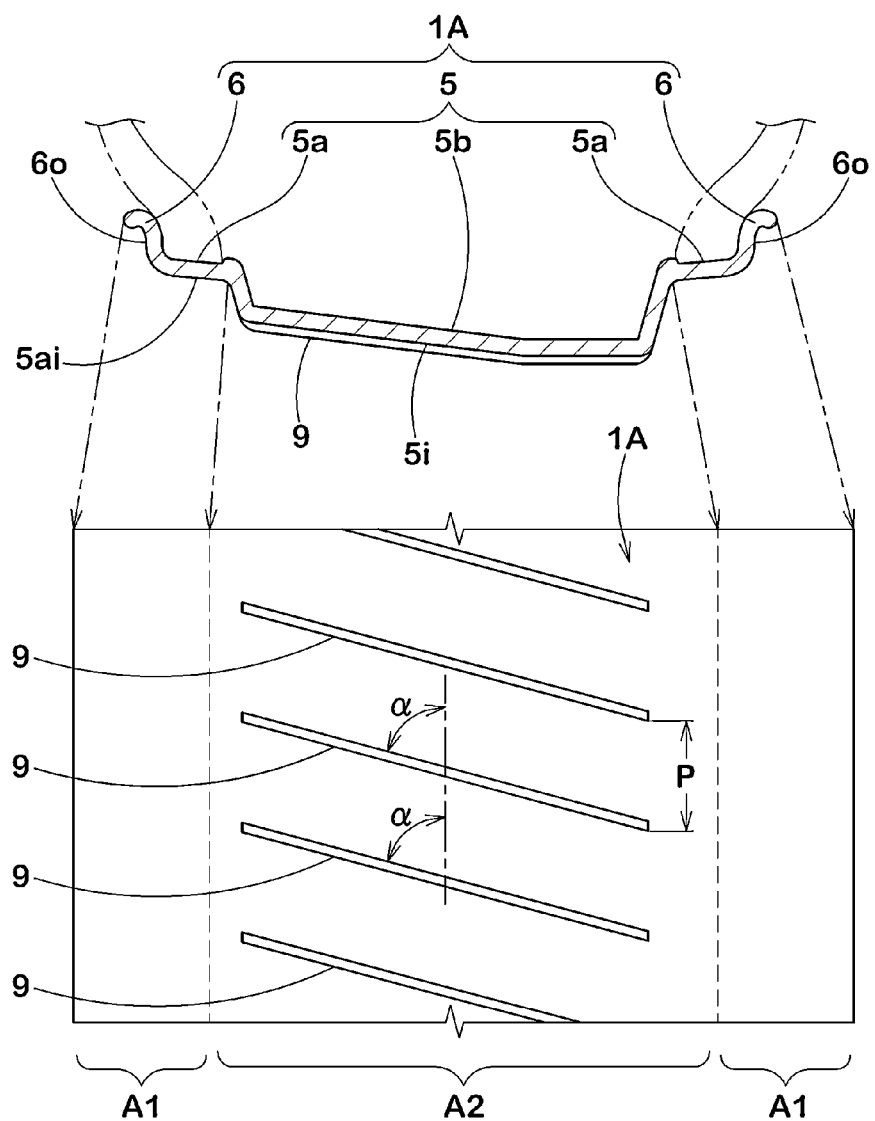
FIG. 9 is a development view of an inner surface of a rim portion showing another embodiment of the convex portions.

In the first embodiment, the convex portions 9 are provided substantially only in the outer regions A1 of the rim portion 1A. Alternatively, the convex portions 9 may be provided to substantially extend only in a central region A2 between a pair of the seat portions 5a, 5a in the inner surface of the rim portion 1A, as shown in FIG. 9.

The convex portions 9 of the second embodiment can cool the well portion 5b of the rim portion 1A more intensively, and can effectively suppress the temperature rise of air charged into the tire cavity i. In the second embodiment also, it is possible to suppress the temperature rise of the rubber portion of the bead portion 2c and to enhance the durability.

Figure 10:
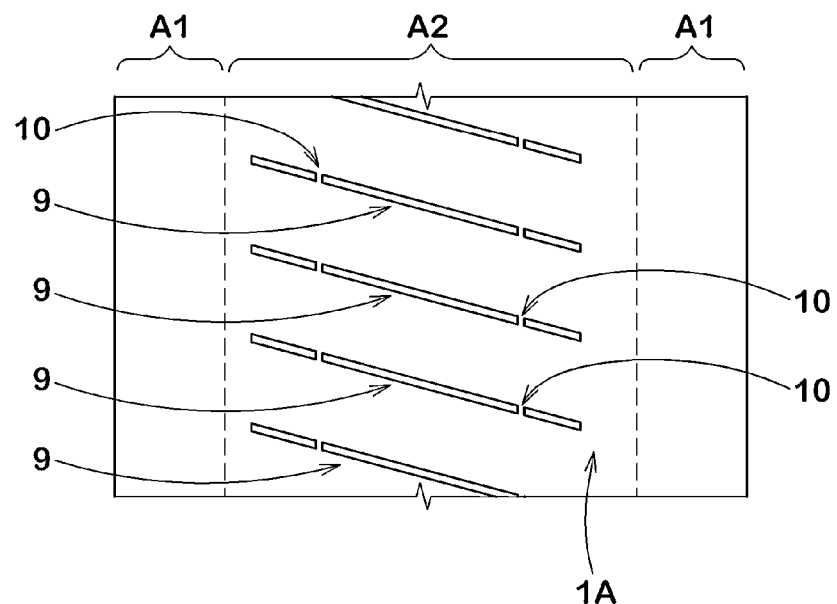
FIG. 10 is a development view of an inner surface of a rim portion showing another embodiment of the convex portions.

In the second embodiment, too, the convex portions 9 may have the disconnections 10 as shown in FIG. 10.

Figure 11:
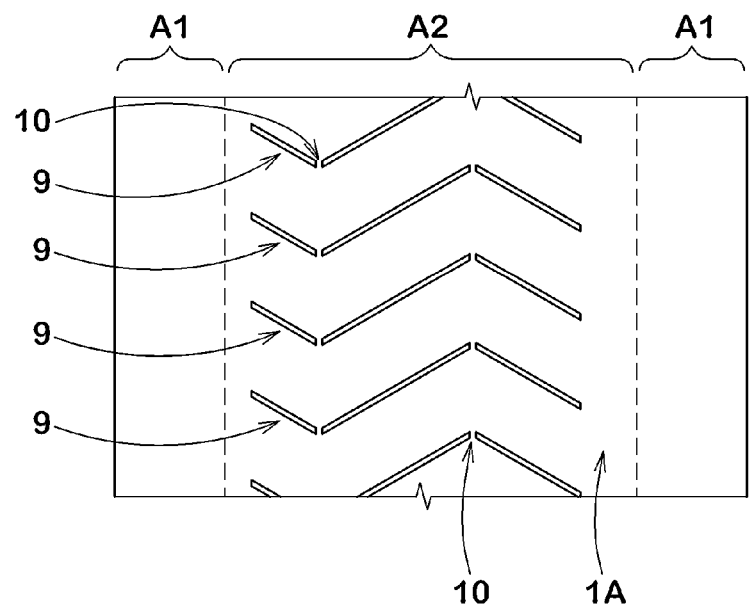
FIG. 11 is a development view of an inner surface of a rim portion showing another embodiment of the convex portions.
Figure 12:
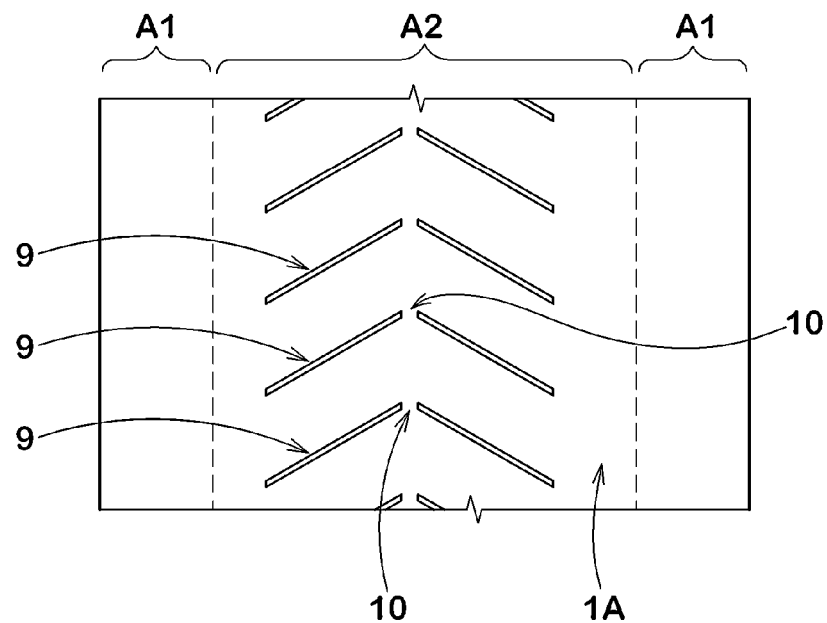
FIG. 12 is a development view of an inner surface of a rim portion showing another embodiment of the convex portions.

Further, as shown in FIGS. 11 and 12, each of the convex portions 9 may be formed into a V-shape or zigzag shape having one or more bent portions. At that time, it is especially preferable that the bent portion has the disconnection 10. According to the second embodiment, stagnation of air is prone to stay behind the bent portion of the convex portion 9, but generation of such a stagnation can be effectively prevented by providing the disconnection 10.

Figure 13:
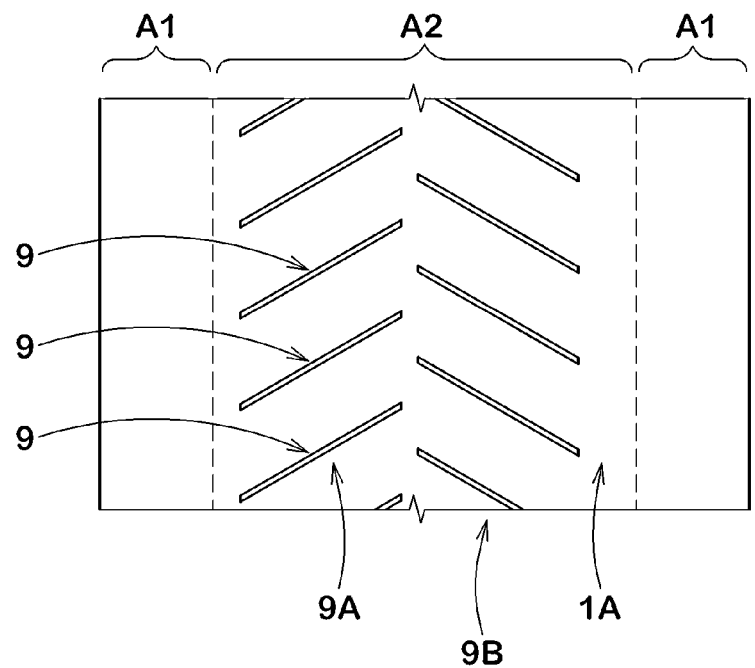
FIG. 13 is a development view of an inner surface of a rim portion showing another embodiment of the convex portions.

Further, as shown in FIG. 13, a plurality of rows (two rows in this embodiment) 9A and 9B of convex portions 9 having different inclining directions can be disposed in a zigzag form such that phases of the rows are different from each other.

[Third Embodiment]

Figure 14:
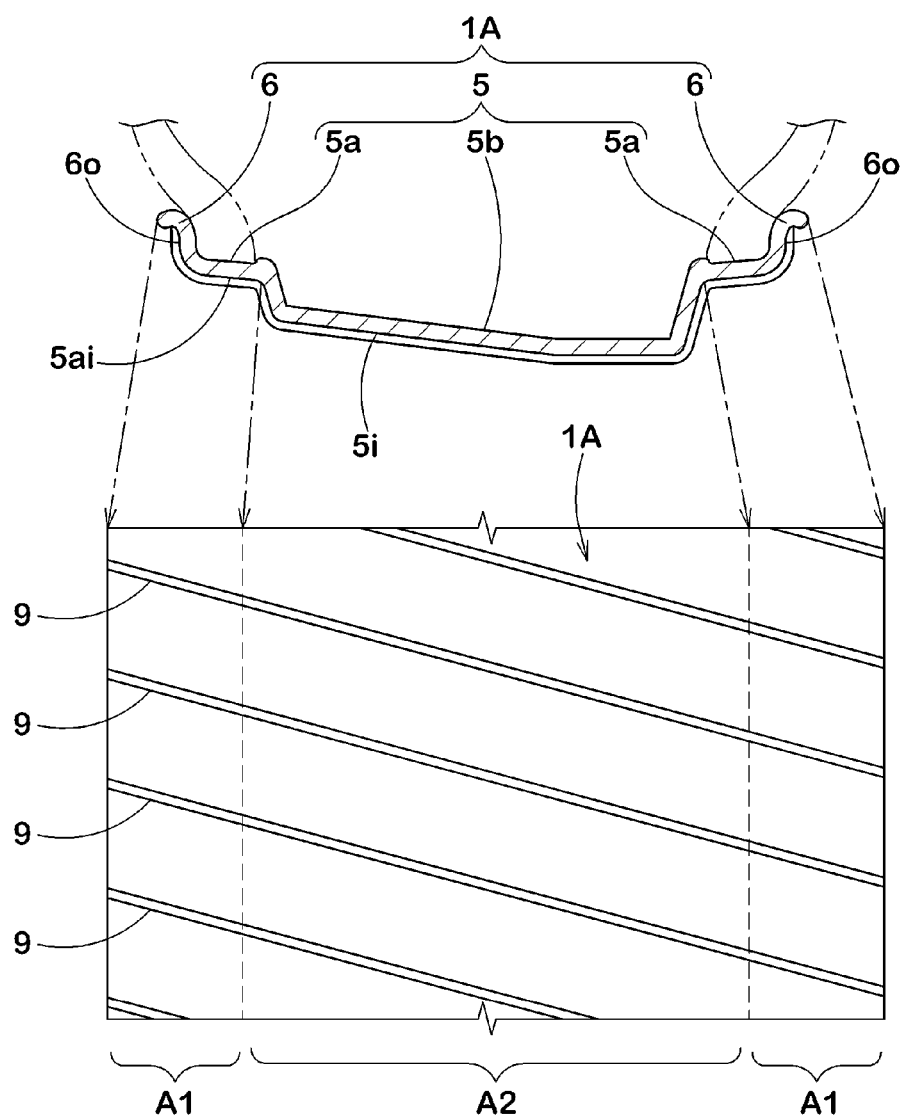
FIG. 14 is a development view of an inner surface of a rim portion showing another embodiment of the convex portions.

Further, as shown in FIG. 14, the convex portions 9 may be provided such that they extend over substantially the entire region (i.e., the outer regions A1 and the central region A2) of the rim portion 1A. The convex portions 9 of this embodiment can effectively cool the entire rim portion 1A. Therefore, it is possible to more reliably prevent not only the temperature rise of the bead portion 2c but also the temperature rise of air charged into the tire cavity "i", thus suppressing the temperature rise of the rubber portion of the bead portion 2c to thereby enhance the durability.

Figure 15:
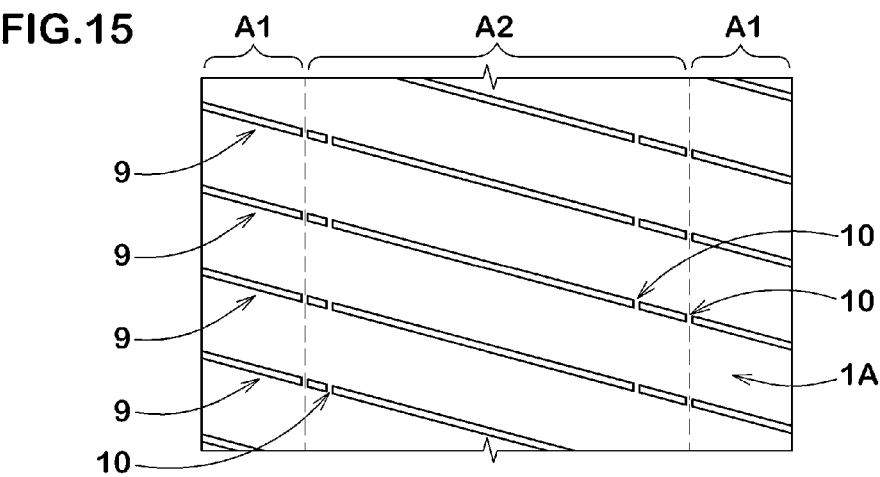
FIG. 15 is a development view of an inner surface of a rim portion showing another embodiment of the convex portions.
Figure 16:
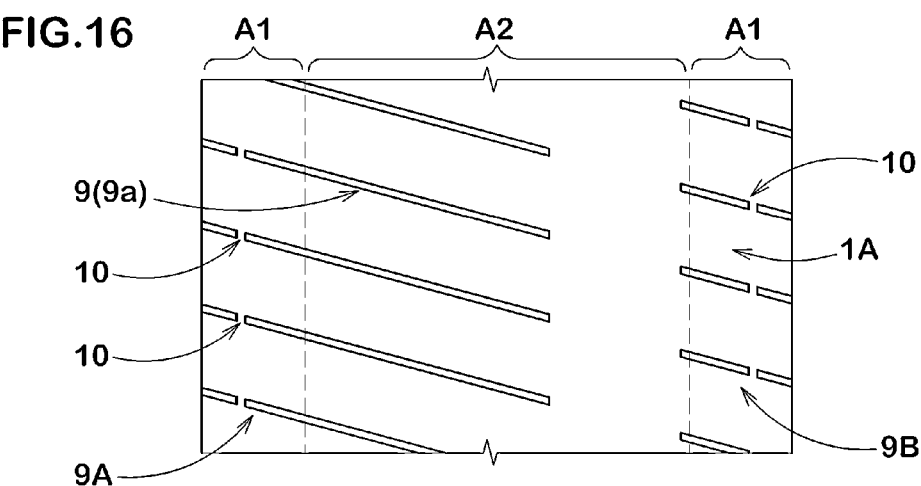
FIG. 16 is a development view of an inner surface of a rim portion showing another embodiment of the convex portions.
Figure 17:
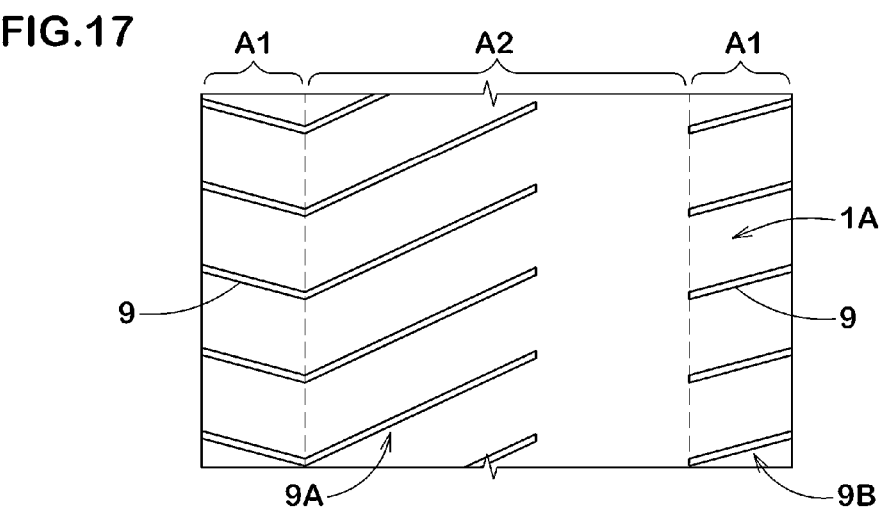
FIG. 17 is a development view of an inner surface of a rim portion showing another embodiment of the convex portions.

Concerning the configuration in which the convex portions 9 are provided substantially in the entire region of the rim portion 1A, the convex portions 9 can be modified variously in the same manner as the first and second embodiments, as shown in FIGS. 15 to 17.

[Fourth Embodiment]

If a weight balance and uniformity of the rim are taken into account, it is preferable that the convex portions 9 are arranged with a constant placement pitch P in the circumferential direction as in the previous embodiments. However, if the convex portions 9 are arranged with the constant placement pitch P, wind noises of specific frequency generated by the convex portions 9 are superimposed on each other depending on a size and/or a cross sectional shape of the convex portion 9 (e.g., when the convex portions 9 are increased in size), and there is a possibility that a passenger in the vehicle feels an irritating unusual sound.

Figure 18:
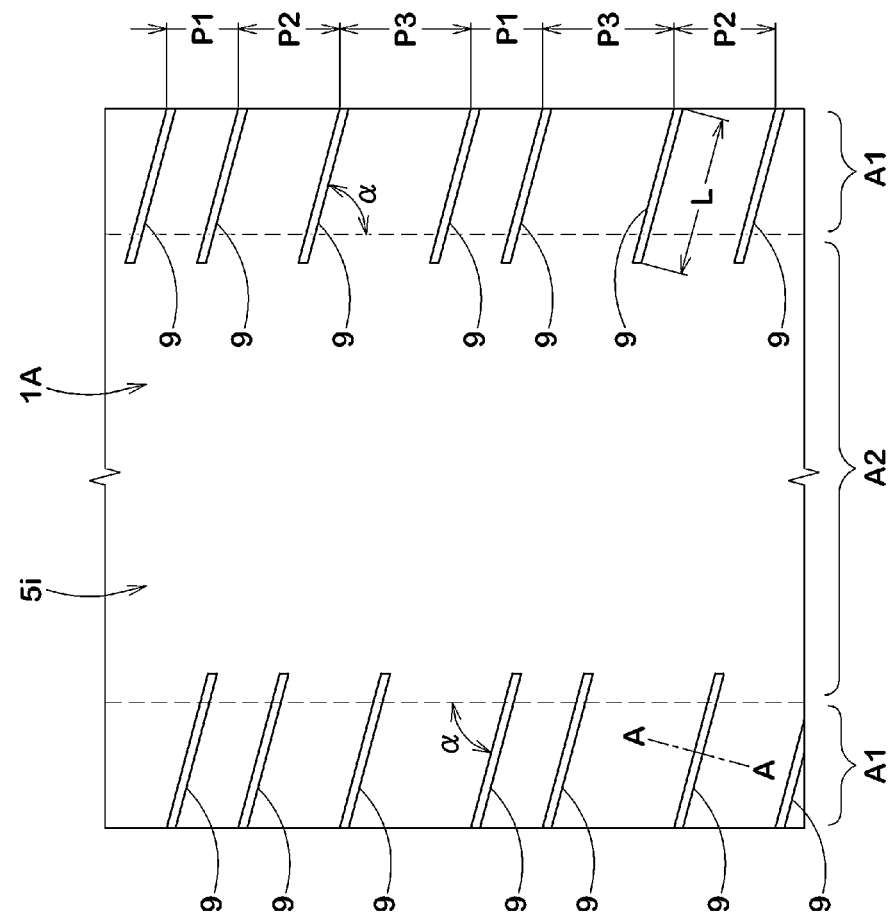
FIG. 18 is a development view of an inner surface of a rim portion showing another embodiment of the convex portions.

To suppress the irritating wind noise during running, the fourth embodiment is characterized in that the convex portions 9 are arranged with non-constant placement pitches P1, P2, P3 . . . in the circumferential direction, as shown in FIG. 18. That is, it is preferable that the placement pitch P of the convex portions 9 includes a plurality of kinds of placement pitches, preferably three or more kinds of pitches, more preferably five or more kinds of pitches. According to this embodiment, it is possible to prevent the superimposition of the wind noises of a specific frequency caused by the convex portions 9 to reduce generation of the irritating unusual sound. Especially, it is more effective to arrange the convex portions 9 at random with non-constant placement pitches in the circumferential direction by arranging the plurality of kinds of placement pitches at random.

To prevent inconvenience caused by unbalanced weight and uniformity of the wheel rim, it is preferable that the non-constant placement pitches P1, P2, . . . are limited within a constant range. Preferably, when a constant pitch obtained by dividing 360° by the number of convex portions is defined as 100, it is preferable that the non-constant placement pitches P are determined with a variation ratio of ±50% between maximum and minimum, i.e., within a range of 50 to 150, more preferably within a range of 70 to 130. From the same viewpoint, when the plurality of kinds of placement pitches P are arranged in the order of size, it is especially preferable that a variation ratio of the adjacent placement pitches is suppressed to 20% or less.

[Fifth Embodiment]

FIGS. 19(a) and 19(b) are cross sectional development views taken along the circumferential direction of the rim portion. In this embodiment, a plurality of kinds of convex portions 9 having different cross sectional shapes are provided at distances from one another in the circumferential direction. In this example, the convex portions 9 include first convex portions 9A and second convex portions 9B which have greater height H and width W than those of the first convex portion 9A. The convex portions may be disposed with the constant placement pitch P as shown in FIG. 19(a), or may be disposed with the non-constant placement pitches as shown in FIG. 19(b). According to this embodiment also, it is possible to prevent the superimposition of the wind noises of the specific frequency, and to reduce the generation of the irritating unusual sound.

Although the embodiments of the present invention have been described above, the invention is not limited to these concrete embodiments, and the invention can be changed and carried out in various modes within a range not departing from the subject matter of the invention. For example, the convex portions 9 may be provided only on the side of the outer regions A1 of the rim portion located on the inner side of the vehicle when the rim portion is mounted on the vehicle so that the convex portions 9 cannot be easily seen from outside.

EXAMPLES

Aluminum alloy wheel rims (size: 18×8J) were prototyped under the specification shown in Table 1, pneumatic tires were mounted on the wheel rims, and a bead durability objective test was carried out. An axial length of the developed outer region A1 of the wheel rim is about 50 mm, and an axial length of the developed central region is about 100 mm.

This test was carried out in an air-conditioned room where a room temperature was maintained at 28±2° C. The temperatures of various portions of the rim and temperatures of an outer surface of the bead portion at three locations on the circumference were measured after one-hour running, and average values thereof were obtained. Time (durability) elapsed until the tire was damaged was measured.

Conditions of the drum durability test are as follows:
Size of the pneumatic tire: 245/40R18
Applied load: 12.01 kN
Air pressure: 360 kPa
Speed: 60 km/h
Radius of drum: 1.7 m Test results are shown in Table 1. In Table 1, temperatures are shown with indices in which a temperature of a comparative example 1 at each time is determined as 100. The smaller the numeric value is, the lower the temperature is. The durability is shown with indices in which time elapsed until a tire of a comparative example is damaged is determined as 100. The greater the numeric value is, the higher the durability is. The placement pitch of the convex portions is constant.

TABLE 1

|  | Comparative example | Example 1 | Example 2 | Example 3 | Example 4 | Example 5 | Example 6a | Example 6b | Example 6c | Example 6d |
|---|---|---|---|---|---|---|---|---|---|---|
| Drawings showing convex portions (first embodiment) | — | FIG. 3 | FIG. 3 | FIG. 3 | FIG. 3 | FIG. 3 | FIG. 3 | FIG. 3 | FIG. 3 | FIG. 3 |
| Height H of convex portion (mm) | 0 | 0.4 | 1 | 2 | 3 | 5 | 5 | 10 | 12.5 | 15 |
| Width W of convex portion (mm) | 0 | 1 | 1 | 3 | 3 | 5 | 10 | 10 | 20 | 20 |
| Cross sectional area of convex portion (mm$^2$) | 0 | 0.4 | 1 | 6 | 9 | 25 | 50 | 100 | 250 | 300 |
| Pitch P of convex portion [center angle] (°) | — | 5 | 5 | 5 | 5 | 5 | 5 | 5 | 15 | 15 |
| Angle α of convex portion with respect to circumferential direction (°) | — | 72 | 72 | 72 | 72 | 72 | 72 | 72 | 72 | 72 |
| Temperature of back side of seat portion after one hour | 100 | 100 | 99 | 95 | 96 | 97 | 98 | 98 | 99 | 100 |

TABLE 1-continued

| | | | | | | | | | |
|---|---|---|---|---|---|---|---|---|---|
| running (index) | | | | | | | | | |
| Temperature of outer surface of well portion after one hour running (index) | 100 | 95 | 94 | 88 | 89 | 90 | 92 | 92 | 93 | 95 |
| Temperature of bead portion after one hour running (index) | 100 | 98 | 94 | 84 | 84 | 87 | 90 | 91 | 92 | 97 |
| Durability (index) | 100 | 108 | 112 | 140 | 139 | 134 | 125 | 123 | 114 | 110 |

| | Comparative example | Example 7 | Example 8 | Example 9 | Example 10 | Example 11 | Example 12 | Example 13 | Example 14 | Example 15 |
|---|---|---|---|---|---|---|---|---|---|---|
| Drawings showing convex portions (second embodiment) | — | FIG. 6 | FIG. 7 | FIG. 8 | FIG. 9 | FIG. 9 | FIG. 9 | FIG. 9 | FIG. 9 | FIG. 10 |
| Height H of convex portion (mm) | 0 | 2 | 2 | 2 | 2 | 2 | 2 | 2 | 2 | 2 |
| Width W of convex portion (mm) | 0 | 3 | 3 | 3 | 3 | 3 | 3 | 3 | 3 | 3 |
| Cross sectional area of convex portion (mm$^2$) | 0 | 6 | 6 | 6 | 6 | 6 | 6 | 6 | 6 | 6 |
| Pitch P of convex portion [center angle] (°) | — | 5 | 5 | 5 | 5 | 5 | 5 | 5 | 5 | 5 |
| Angle α of convex portion with respect to circumferential direction (°) | — | 72 | 72 | 72 | 72 | 90 | 48 | 24 | 8 | 72 |
| Temperature of back side of seat portion after one hour running (index) | 100 | 95 | 96 | 95 | 91 | 94 | 89 | 90 | 94 | 93 |
| Temperature of outer surface of well portion after one hour running (index) | 100 | 88 | 89 | 88 | 95 | 96 | 94 | 95 | 96 | 95 |
| Temperature of bead portion after one hour running (index) | 100 | 83 | 84 | 83 | 92 | 97 | 90 | 92 | 96 | 92 |
| Durability (index) | 100 | 140 | 138 | 142 | 118 | 105 | 125 | 121 | 110 | 116 |

| | Comparative example | Example 16 | Example 17 | Example 18 | Example 19 | Example 20 | Example 21 | Example 22 |
|---|---|---|---|---|---|---|---|---|
| Drawings showing convex portions (third embodiment) | — | FIG. 11 | FIG. 12 | FIG. 13 | FIG. 14 | FIG. 15 | FIG. 16 | FIG. 17 |
| Height H of convex portion (mm) | 0 | 2 | 2 | 2 | 2 | 2 | 2 | 2 |
| Width W of convex portion (mm) | 0 | 3 | 3 | 3 | 3 | 3 | 3 | 3 |
| Cross sectional area of convex portion (mm$^2$) | 0 | 6 | 6 | 6 | 6 | 6 | 6 | 6 |
| Pitch P of convex portion [center angle] (°) | — | 5 | 5 | 5 | 5 | 5 | 5 | 5 |
| Angle α of convex portion with respect to circumferential direction (°) | — | 72 | 72 | 72 | 72 | 72 | 72 | 72 |
| Temperature of back side of seat portion after one hour running (index) | 100 | 93 | 92 | 92 | 86 | 92 | 85 | 93 |
| Temperature of outer surface of well portion after one hour running (index) | 100 | 95 | 95 | 95 | 85 | 86 | 84 | 86 |
| Temperature of bead portion after one hour running (index) | 100 | 92 | 92 | 91 | 77 | 82 | 77 | 82 |
| Durability (index) | 100 | 117 | 116 | 118 | 164 | 150 | 165 | 151 |

As a result of the test, it was confirmed that the wheel rims of the examples can suppress heating of the pneumatic tire to enhance its durability.

Next, a test concerning a relationship between the placement pitch of the convex portions and the wind noise caused during running was carried out. Concerning the wind noise, the prototyped tires were mounted to all wheels of a domestic passenger vehicle having a piston displacement of 3000 cc, the vehicle was made to run on a smooth dry asphalt test course in a steady state at 50 km/h and 80 km/h, and it was checked whether there was an unusual sound by a driver's sense. A random arrangement of placement pitches in Example 24 is as follows:

<Specification of Convex Portions in Example 24>
The number of kinds of placement pitches: 5
SS pitch: 3.7°×6 convex portions
S pitch: 4.3°×20 convex portions
M pitch: 5.0°×16 convex portions
L pitch: 5.6°×23 convex portions
LL pitch: 6.2°×7 convex portions Arrangement of placement pitches: SS, S, S, L, L, LL, LL, L, M, S, M, L, S, S, SS, S, M, L, L, S, M, M, L, L, L, L, S, S, S, S, S, S, L, L, L, L, LL, L, L, M, SS, S, M, M, LL, L, M, S, M, LL, L, S, S, SS, S, M, L, L, LL, LL, L, M, M, SS, S, M, L, L, M, M, SS In Examples 25 and 26, heights of the convex portions were unified to 10 mm, but the convex portions had two kinds of widths, i.e., 5 mm and 10 mm. These two kinds of convex portions were disposed alternately one each (36 convex portions for each kind) in the circumferential direction. The placement pitch of the convex portions of Example 25 was constant, but the above-mentioned random placement pitch of the convex portions was applied to Example 26. The results of the test are shown in Table 2.

arranged with random placement pitches, it was observed that wind noise of irritating level was not generated.

What is claimed is:

1. A wheel rim for a tire comprising a rim portion including a rim body and a pair of flanges, the rim body having seat portions for seating bead portions of the tire at both ends of the rim body in a rotation axis direction thereof, and the pair of flanges being continuously provided on both sides of the rim body and extending radially outward, wherein
    convex portions which extend in a direction intersecting with a circumferential direction of the tire are provided at intervals in the circumferential direction, on an outer surface of the flanges in the rotation axis direction which does not come into contact with the tire, or on an inner surface of the rim body in a radial direction,
    wherein the convex portions are arranged with a non-constant placement pitch in the circumferential direction.

2. The wheel rim of claim 1, wherein a cross sectional area of the convex portion perpendicular to a longitudinal direction thereof is 1 to 250 mm$^2$.

3. The wheel rim of claim 2, wherein a projecting height of the convex portion is 1 mm or more and 5 mm or less, and a placement pitch P of the convex portion in the circumferential direction is 2° or more and 12° or less at a center angle of the convex portion.

4. The wheel rim of claim 2, wherein the convex portion extends at an angle in a range from 5° or more to less than 90° with respect to the circumferential direction.

5. The wheel rim of claim 2, wherein the convex portion is provided on the outer surface of the flange and an inner surface of the seat portion in the radial direction.

6. The wheel rim of claim 2, wherein the convex portion extends between a pair of the seat portions.

TABLE 2

|  | Example 5 | Example 23 | Example 24 | Example 25 | Example 26 |
| --- | --- | --- | --- | --- | --- |
| Drawings showing convex portions | FIG. 3 | FIG. 3 | FIG. 18 | FIG. 19 (a) | FIG. 19 (b) |
| Height H of convex portion (mm) | 5 | 10 | 10 | 10 | 10 |
| Width W of convex portion (mm) | 5 | 10 | 10 | 5, 10 | 5, 10 |
| Cross sectional area of convex portion (mm$^2$) | 25 | 100 | 100 | 50, 100 | 50, 100 |
| Angle α of convex portion with respect to circumferential direction (°) | 72 | 72 | 72 | 72 | 72 |
| Pitch P of convex portion [center angle] (°) | 5 (Constant) | 5 (Constant) | Random | 5 (Constant) | Random |
| Unusual sound during running 50 km/h | Not generated | Not generated | Not generated | Not generated | Not generated |
| Unusual sound during running 80 km/h | Not generated | Generated | Not generated | Slightly generated | Not generated |

First, in Example 5 in which the convex portions were arranged with the constant placement pitch, the driver did not feel an unusual sound. On the other hand, in Example 23 in which the height and the width of the convex portion were greater than those in Example 5 and the convex portions were arranged with the constant placement pitch, it was observed that wind noise of irritating level was generated at a speed of 80 km/h. However, in Example 24 in which convex portions had the same shape and size as those of Example 23, but five kinds of placement pitches were applied and these pitches were arranged at random, it was observed that wind noise of irritating level was not generated at any speed. In a similar manner, in Example 25, it was observed that wind noise of slightly irritating level was generated at a speed of 80 km/h, but in Example 26 in which the convex portions were 7. The wheel rim of claim 1, wherein a cross sectional area of the convex portion perpendicular to a longitudinal direction thereof is 1 to 25 mm$^2$.

8. The wheel rim of claim 7, wherein the convex portion extends at an angle in a range from 5° or more to less than 90° with respect to the circumferential direction.

9. The wheel rim of claim 7, wherein the convex portion is provided on the outer surface of the flange and an inner surface of the seat portion in the radial direction.

10. The wheel rim of claim 7, wherein the convex portion extends between a pair of the seat portions.

11. The wheel rim of claim 3, wherein a projecting height of the convex portion is 1 mm or more and 5 mm or less, and a placement pitch P of the convex portion in the circumferential direction is 2° or more and 12° or less at a center angle of the convex portion.

12. The wheel rim of claim 1, wherein the convex portion extends at an angle in a range from 5° or more to less than 90° with respect to the circumferential direction.

13. The wheel rim of claim 12, wherein the convex portion is provided on the outer surface of the flange and an inner surface of the seat portion in the radial direction.

14. The wheel rim of claim 12, wherein the convex portion extends between a pair of the seat portions.

15. The wheel rim of claim 1, wherein the convex portion is provided on the outer surface of the flange and an inner surface of the seat portion in the radial direction.

16. The wheel rim of claim 1, wherein the convex portion extends between a pair of the seat portions.

17. The wheel rim of claim 1, wherein a projecting height of the convex portion is 1 mm or more and 5 mm or less, and a placement pitch P of the convex portion in the circumferential direction is 2° or more and 12° or less at a center angle of the convex portion.

18. The wheel rim of claim 1, wherein the convex portions are arranged at random with the non-constant placement pitch in the circumferential direction.

\* \* \* \* \*